United States Patent Office 3,332,245
Patented July 25, 1967

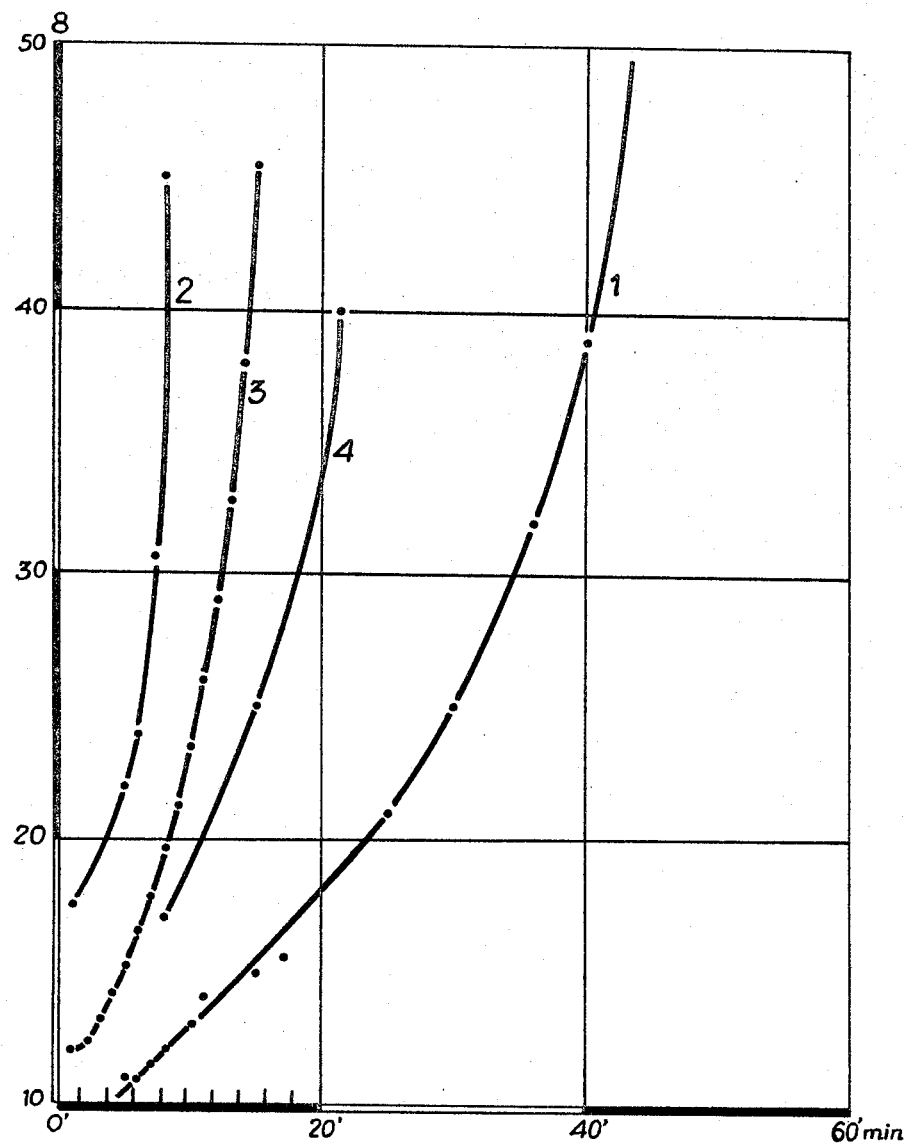

3,332,245
METHOD FOR INJECTING THE COMPONENTS OF A PHENOPLASTIC RESIN INTO SLIGHTLY WATERTIGHT GROUNDS
Claude Caron, Le Vesinet, France, assignor to Soletanche, Paris, France, a French body corporate
Filed May 12, 1964, Ser. No. 366,782
Claims priority, application France, Nov. 13, 1960, 810,063, Patent 1,248,651
6 Claims. (Cl. 61—36)

The present specification is a continuation-in-part of my co-pending application Ser. No. 69,160, and now abandoned.

My invention relates to a process for the stabilization and strengthening of shifting or loose soils or terrain having a low permeability, for example, terrain formed of fine grained silts or slimy sands in proximity with ground surface.

An object of the invention is to provide a process for effecting the stabilization or strengthening of such terrain in situ by a single operation which can be simply and rapidly performed without requiring the employment of complex or costly equipment. More specifically, it is an object of the invention to provide a process whereby a resin is formed in situ in the ground or terrain from liquid constituents injected therein at substantially atmospheric or ambient temperature and pressure, which resin forms and is set in the absence of air and at ambient temperature and pressure for stabilizing and strengthening the soils or terrain in which it is formed without the necessity of applying relatively high pressures or temperatures thereto. Further, it is essential that the liquid constituents of the resin to be formed in the ground must have low viscosities corresponding to that of water so as to avoid the necessity of employing high pressures for the injection of the liquid constituents, particularly when the soils or terrain to be stabilized have low permeability.

In accordance with the invention, the foregoing objects are realized by injecting into the terrain of low permeability, at substantially ambient temperature and pressure, aqueous solutions of formaldehyde, resorcinol and a catalyst which is preferably a mixture of sodium bicarbonate and ammonia or ammonium persulfate, for rapidly forming in the soil a resorcinol-plastic resin which sets in the presence of excess water at ambient temperature and pressure and in the absence of air. The amount of the injected resorcinol is approximately between one-half and two parts by weight for each part of injected formaldehyde, while the total quantity of resorcinol and formaldehyde is at least equal to 30% and generally to about 35 to 40% by weight of the soil into which the aqueous solutions are injected. Finally, the time required for solidification or setting of the resorcinol-plastic resin is regulated by selection of the catalyst and of the quantity of the latter, while the proportions of the resorcinol with respect to that of the formaldehyde are selected to assure solidification of the resin at the ambient temperature which may vary in accordance with the depth to which the aqueous solutions are injected.

This distinguishes from prior methods wherein the treatment is effected under heat or, in part, with a viscous resin which is unsuitable for injection into impermeable soil, or the operation is effected in two stages, or the products employed hitherto are entirely different from those employed in the present application.

The aqueous solutions of formaldehyde and resorcinol injected according to my invention, may contain at least 75% of water, in which case a high rise in the temperature of the resin being formed or of the surrounding soil is avoided even though the reaction of the formaldehyde and resorcinol is highly exothermic in the absence of substantial quantities of water.

Since the formaldehyde and resorcinol are not reacted with each other to any extent prior to the injection of the aqueous solutions thereof into the ground, that is, are injected in the monomeric form, the viscosity of the injected solutions approximates that of water, that is, is equal to about 3 centipoises, and remains at that same value until mass polymerization occurs in the ground in the presence of the catalyst, the injections of the solution of formaldehyde and resorcinol and of the catalyst being effected under ambient pressures. It is essential that the substance reacted with the formaldehyde to form a resin in situ in the ground should be resorcinol, as the latter uniquely reacts with formaldehyde at ambient or atmospheric temperatures in the presence of an excess of water, whereas, ordinary phenol, such as that used in the preparation of Bakelite, does not react at ambient temperatures in the presence of an excess of water.

As is apparent from the accompanying graph, the reaction is highly exothermic under low dilution, while, on the contrary, as soon as there is at least 75% of water in the mixture, there is no longer any risk of a high rise in temperature of the resin or of the ground into which the latter is injected.

In the accompanying graph, the curves 1 to 4 show the rise in temperature as a function of time.

The compositions of the different mixtures are as follows:

| Curve | Resorcinol (gr.) | Formaldehyde (cc.) | HCl (cc.) | Persulfate (gr.) of ammonia |
|---|---|---|---|---|
| 1 | 500 | 500 | 10 | |
| 2 | 500 | 500 | 40 | |
| 3 | 333 | 333 | 26 | |
| 4 | 333 | 333 | 26 | 13 |

For very short durations of setting, it is desirable to separately inject the resin and the catalyst so that the mixture of the components may begin forming only at the top of the bore.

For this purpose use is made of a main pump with a large output for injecting the resin and a small volumetric pump for injecting the catalyst.

We will now give, by way of example and in a non-limiting sense, a few compositions which may serve for injection into a ground of fine sand having a permeability of $10^{-2}$ cm./sec., in proximity with ground level.

*Example 1*

Water _____litres__ 30
Resorcinol _____kg__ 30
Formaldehyde _____litres__ 30
Persulfate of ammonia _____grs__ 800

*Example 2*

Water _____litres__ 30
Sodium bicarbonate _____kg__ 2
Resorcinol _____kg__ 30
Formaldehyde _____litres__ 30

*Example 3*

Water _____litres__ 25
Resorcinol _____kg__ 30
Formaldehyde _____litres__ 30

The mixture of Example 3 is injected through the main pump, while the auxiliary pump injects the following mixture:

|                  | Liters |
|------------------|--------|
| Ammonia          | 1.5    |
| Soda bicarbonate | 1.5    |
| Water            | 5      |

All these injections of resin have been executed under ambient pressures above atmospheric pressure by the small amount required, say 200 gr. per sq. cm., that is just the amount required for driving out the air remaining in the sandy material.

The viscosity of the monomer approximates that of water and is equal to about 3 centipoises and remains at the same value until mass polymerization is obtained.

After treatment, it has been possible to open a pit in the injected sand by means of a pneumatic hammer, the resistance of the ground having risen to at least 20 kg. per sq. cm.

Obviously, any detail modification considered as useful for any particular application may be effected in the composition of the mixture to be injected without unduly widening thereby the scope of the invention as defined in the accompanying claims. For instance, it has been found that it is of advantage to further incorporate in the mixture various phenols such as ordinary non-substituted phenol, cresol, xylenol, naphthol, paratertiobutylphenol.

The polymerization is obtained only in the presence of the catalyst. The time during which the mixture remains perfectly fluid is adjusted by the concentration of the catalyst. Obviously for only slightly permeable terrains, the setting should be larger so as to allow the injection to proceed at a reduced speed.

It has been found that a mixture containing no catalyst has a pH of about 6 and is polymerized only after a very long time, say several weeks. However, it may be polymerized when its pH becomes acid or basic.

Shorter setting is obtained in an acid medium and longer setting in a basic medium.

The desired duration of setting is obtained by concentrating the acid or the base as apparent from the following tables:

TABLE I.—DURATION OF SETTING AS A FUNCTION OF THE CONCENTRATION OF THE ACID OR OF THE BASE

|  | HCl, percent in mixture | | | | | | | | |
|---|---|---|---|---|---|---|---|---|---|
|  | 0.4 | 0.45 | 0.60 | 1 | 2 | 3 | 4 | 4.5 | 5.5 |
| Duration of setting: | | | | | | | | | |
| Mixture 1 | 3 hr | 2½ hr | 1 hr | 45 min | 20 min | 7 min |  | 6 min | 14 min |
| Mixture 2 |  |  |  | 1 hr., 25 min | 36 min |  | 18 min |  | 12 min |
| Mixture 3 |  |  |  | 1 hr | 30 min |  | 13 min |  | 7 min |

Mixture 1: Water, 640; resorcinol, 150; formaldehyde, 180.
Mixture 2: Water, 910; resorcinol, 125; formaldehyde, 150.
Mixture 3: Water, 640; resorcinol, 90; formaldehyde, 180.

An acid catalyst may be constituted by a weak acid, such as tartar picric or oxalic acid or else by ammonium salts which release the corresponding acid in accordance with Roncheze's reaction.

TABLE II.—SLOW CATALYSIS IN THE PRESENCE OF NaOH

|  | Soda lye in mixture | | | | | |
|---|---|---|---|---|---|---|
|  | 0 | 2 | 4 | 6 | 8 | 10 |
| Duration of setting, hours: | | | | | | |
| Mixture 4 | 120 | 75 | 59 | 75 |  |  |
| Mixture 5 | 65 | 7 | 2½ | 3 | 17 |  |
| Mixture 6 | 96 | 47½ | 49½ | 150 |  |  |
| Mixture 7 | 110 | 22½ | 20 | 20¾ | 23½ | 61 |

Mixture 4: Water, 910; resorcinol, 125; formaldehyde, 150.
Mixture 5: Water, 640; resorcinol, 90; formaldehyde, 180.
Mixture 6: Water, 910; resorcinol, 120; formaldehyde, 150.
Mixture 7: Water, 650; resorcinol, 150.

Such a basic catalysis may be obtained also with weak bases such as potassium and sodium carbonate and bicarbonate.

The ratio between the formaldehyde and the resorcinol may also vary widely within a range extending between about one half and two parts by weight of resorcinol for each part of formaldehyde.

The optimum proportion is defined by crushing samples of pure resin or of a mixture of resin with sand. It is thus found that the optimum proportion is obtained by using 800 gr. of resorcinol with one litre of formaldehyde at 30%.

The resistance obtained is independent of the nature and concentration of the catalyst whereas in contradistinction the duration of setting depends on the nature and concentration of the catalyst.

Such mixtures can be considerably diluted. For reduced dilutions, the reaction is highly exothermic and it is of interest to inject separately the resin and the catalyst so that the mixture is formed only at the head of the borehole as already mentioned. The main large output pump for the resin is coupled with a small volumetric pump injecting the catalyst.

A modification of the output fed by the small volumetric pump modifies the amount of catalyst incorporated with the mixture and consequently the duration of setting of the resin.

Further examples are given hereinafter for the injection of fine sand (permeability $10^{-2}$ to $10^{-4}$ cm./sec.).

*Example 5*

| Water | litres | 100 |
|---|---|---|
| Formaldehyde (30%) | do | 15 |
| Resorcinol | kg | 11 |
| Soda | kg | 4 |

*Example 6*

| Water | litres | 100 |
|---|---|---|
| Resorcinol | kg | 20 |
| Formaldehyde (30%) | kg | 24 |
| Ammonium persulfate | kg | 2 |

*Example 7*

| Water | litres | 100 |
|---|---|---|
| Sodium | kg | 4 |
| Resorcinol | kg | 18 |
| Formaldehyde (40%) | litres | 20 |

*Example 8*

(a)

| Water | litres | 90 |
|---|---|---|
| Resorcinol | kg | 20 |

Formaldehyde (40%)—20 litres on the one hand through the man pump and (b)

| Ammonium | litres | 2.5 |
|---|---|---|
| Soda | do | 2.5 |

Water—5 litres on the other hand through the auxiliary pump.

All the injections of resin are executed under a pressure ranging between atmospheric pressure and a pressure rising by 2 kg./sq. cm. at a maximum above atmospheric pressure for the finest sands. The pressure is constant throughout injection. This is ascribable to the fact that the viscosity of the highly diluted monomeric solution approximates that of water (about 2 centipoises) and remains unchanged until the mass is polymerized bodily.

All the intervals between the sand particles were fitted perfectly.

It has been found that different phenols could be added to the mixture: ordinary phenol, cresol, xylenol, naphthol, paratertiobutylphenol.

What I claim is:

1. A method for stabilizing sandy soils and other loose terrains of low permeability in situ at shallow depths by forming therein a resin in a single operation, consisting in injecting into said terrains under ambient temperature and pressure conditions a mixture of monomeric resorcinol, an aqueous solution of monomeric formaldehyde and a weak catalyst in an amount of water sufficient to provide a total water content which constitutes more than 75 percent of the injected mixture, the ratio of resorcinol to formaldehyde solution in said injected mixture being in the range between ½:1 to 2:1, by weight, based upon a 30 percent concentration of formaldehyde in said solution thereof, and the total amount of resorcinol and of formaldehyde being at least equal to approximately 30 percent, by weight, of the terrain into which said mixture is injected.

2. The method according to claim 1; wherein the proportion of resorcinol to formaldehyde in said mixture is approximately 800 grams of resorcinol for each liter of 30 percent solution of formaldehyde.

3. The method according to claim 1; wherein the amount of said weak catalyst in the mixture is substantially less than 2.5 percent of the weight of the total mixture.

4. The method according to claim 1; wherein said mixture further contains an additional phenol selected from the group consisting of non-substituted phenol, cresol, xylenol, naphthol and paratertiobutyl-phenol.

5. Thet method according to claim 1; wherein said catalyst is ammonium persulfate present in said mixture in an amount of about 0.8 percent, by weight, based on the total weight of said mixture.

6. The method according to claim 1; wherein said formaldehyde is produced by a substance adapted to release aldehyde during the injection of said mixture.

References Cited
UNITED STATES PATENTS

| | | | |
|---|---|---|---|
| 2,595,184 | 4/1952 | Wrightsman | 61—36 |
| 2,736,718 | 2/1956 | Webber | 260—29.3 |
| 2,802,805 | 8/1957 | Dietz | 260—38 |
| 2,933,461 | 4/1960 | Mullen | 260—2.5 |

DAVID J. WILLIAMOWSKY, *Primary Examiner.*

JACOB SHAPIRO, *Examiner.*